US008138682B2

(12) United States Patent
Godyak et al.

(10) Patent No.: US 8,138,682 B2
(45) Date of Patent: Mar. 20, 2012

(54) SYMMETRICAL RF POWER SUPPLY FOR INDUCTIVELY COUPLED ELECTRODELESS LAMPS

(75) Inventors: Valery A. Godyak, Brookline, MA (US); Eugen Statnic, Munich (DE); Felix Franck, Munich (DE)

(73) Assignee: OSRAM SYLVANIA Inc., Danvers, MA (US)

( * ) Notice: Subject to any disclaimer, the term of this patent is extended or adjusted under 35 U.S.C. 154(b) by 86 days.

(21) Appl. No.: 12/599,907

(22) PCT Filed: Apr. 29, 2008

(86) PCT No.: PCT/US2008/061867
§ 371 (c)(1),
(2), (4) Date: Jul. 20, 2010

(87) PCT Pub. No.: WO2008/140932
PCT Pub. Date: Nov. 20, 2008

(65) Prior Publication Data
US 2010/0283399 A1    Nov. 11, 2010

Related U.S. Application Data

(60) Provisional application No. 60/928,603, filed on May 10, 2007.

(51) Int. Cl.
*H05B 37/02* (2006.01)
(52) U.S. Cl. .......................... 315/224; 315/219; 315/248
(58) Field of Classification Search .................. 315/219, 315/224, 248, 276, 287, 291
See application file for complete search history.

(56) References Cited

U.S. PATENT DOCUMENTS

| 4,383,203 | A | | 5/1983 | Stanley |
| 5,446,350 | A | * | 8/1995 | El-Hamamsy et al. ....... 315/248 |
| 5,550,438 | A | * | 8/1996 | Reijnaerts ..................... 315/219 |
| 5,952,790 | A | * | 9/1999 | Nerone et al. ............ 315/209 R |
| 5,962,987 | A | * | 10/1999 | Statnic .......................... 315/248 |
| 5,977,725 | A | | 11/1999 | Miyazaki et al. |
| 6,051,934 | A | * | 4/2000 | Nerone ..................... 315/209 R |
| 2002/0180377 | A1 | * | 12/2002 | Miyazaki et al. ............. 315/219 |
| 2003/0057871 | A1 | | 3/2003 | Kominami |

FOREIGN PATENT DOCUMENTS

GB    2 080 652 A    2/1982

OTHER PUBLICATIONS

Written Opinion of the International Searching Authority for PCT/US08/61867, completed Aug. 8, 2008, mailed Aug. 14, 2008.

* cited by examiner

*Primary Examiner* — Tung X Le
(74) *Attorney, Agent, or Firm* — Shaun P. Montana

(57) ABSTRACT

A radio frequency (RF) power supply for an electrodeless lamp includes a pair of DC rails, an RF inverter having power input terminals connected between the rails, a first inductor arranged to inductively couple with an electrodeless lamp, first and second resonance capacitors that each connects a respective one of two input terminals of the first inductor to a same first rail of the pair of DC rails, and a second (ballasting) inductor connecting an output of the RF inverter to one of the two input terminals of the first inductor. Thus, the first inductor is connected in a symmetrical π-filter and supplied by two equal but phase-opposite voltages whose sum is the lamp voltage. The inductance of the ballasting inductor is significantly reduced so that the RF efficiency of the power supply is 96%.

9 Claims, 4 Drawing Sheets

| Table 1: Details and results of | $E = 350 V_{DC}$; $V_1 = 552V$; $I_1 = 2.25A$; $P_1 = 150W$; $L_1 = 16.6\mu H$; Dt: core 10x6x4 K1, 6/4/4 turns; $f_0 = 2.5MHz$; $f_{RS} = 2.45MHz$ | | |
|---|---|---|---|
| Fig. 1 | Fig. 2 | Fig. 3 | Fig. 4 |
| $S_{1\&2}$: IRF730 | $S_{1\&2}$: IRF730 | $S_{1\&2}$: BUZ205 | $S_{1\&2}$: BUZ205 |
| $C_i = 6pF$ | $C_i = 10pF$ | $C_i = 22pF$ | $C_i = 22pF$ |
| $C_G = 1.8nF$ | $C_G = 2nF$ | $C_G = 220pF$ | $C_G = 220pF$ |
| $C_p = 330pF$ | $C_p = 0$ | $C_p = 0$ | $C_p = 0$ |
| $L_L = 37.2\mu H$ | $L_L = 24.1\mu H$ | $L_L = 18.4\mu H$ | $L_L = 18.4\mu H$ |
| $C_R = 370pF$ | $C_R = 580pF$ | $C_1 = 720pF$ | $C_1 = 720pF$ |
| $\Delta V_1 = 552V$ | $\Delta V_G = 362V$ | $\Delta V_{C1} = 277V$ | $\Delta V_{C1} = 277V$ |
| $I_{CR} = 3.21 Arms$ | $I_{CR} = 3.3 Arms$ | $I_{C1} = 3.13 Arms$ | $I_{C1} = 3.13 Arms$ |
| $C_C = 33nF$ | $C_S = 750pF$ | $C_2 = 515pF$ | $C_2 = 515pF$ |
| $V_{CC} = 175 V_{DC}$ | $\Delta V_{CS} = 190V$ | $\Delta V_{C2} = 277V$ | $\Delta V_{C2} = 277V$ |
| $I_L = 3.8 App$ | $I_L = 3.4 App$ | $I_L = 3.2 App$ | $I_L = 3.2 App$ |
| $P_{DC} = 163.5W$ | $P_{DC} = 159.4W$ | $P_{DC} = 156.3W$ | $P_{DC} = 155.8W$ |
| $P_{Loss} = 13.5W$ | $P_{Loss} = 9.4W$ | $P_{Loss} = 6.3W$ | $P_{Loss} = 5.8W$ |
| $P_{LossLL} = 7.8W$ | $P_{LossLL} = 4.4W$ | $P_{LossLL} = 2.7W$ | $P_{LossLL} = 2.7W$ |
| $P_{LssS1S2} = 4.4W$ | $P_{LssS1S2} = 3.6W$ | $P_{LssS1S2} = 2.4W$ | $P_{LssS1S2} = 2.4W$ |
| $\eta = 91.7\%$ | $\eta = 94.1\%$ | $\eta = 96.0\%$ | $\eta = 96.3\%$ |

Figure 5

SYMMETRICAL RF POWER SUPPLY FOR INDUCTIVELY COUPLED ELECTRODELESS LAMPS

CROSS-REFERENCE TO RELATED APPLICATIONS

The present application claims priority of U.S. Provisional Application 60/928,603 filed May 10, 2007, and PCT Application No. PCT/US08/61867 filed Apr. 29, 2008, the entire contents of which are hereby incorporated by reference.

BACKGROUND

The present invention is directed to a radio frequency (RF) power supply for operating an electrodeless lamp, such as a fluorescent, molecular, or high intensity discharge electrodeless lamp. An RF power supply converts a DC voltage to a suitable radio frequency for the lamp and is typically part of the electronic ballast of the lamp. The RF power supply includes a ballasting inductor that is coupled to the electrodeless lamp to ignite and maintain the plasma in the lamp's discharge gas, without providing electrodes in the lamp bulb.

Because the complete electronic ballast includes numerous components in addition to the RF power supply (e.g., EMI filter, rectifier, PFC boost stage, DC bus electrolytic capacitors), the efficiency of the RF power supply is desirably 95% or more, which has not been achievable in a commercially available power supply. It has been found that one of the key factors in improving efficiency is reducing power loss in the ballasting inductor that is coupled to the lamp.

FIG. 1 shows a known circuit for an RF power supply whose efficiency is about 91.7%. DC power source E delivers a DC voltage to a pair of DC rails, with a electrolytic capacitor (parasitic inductance) $C_0$. During operation, first inductor $L_1$ is inductively coupled to lamp D. Transistors $S_1$ and $S_2$ are driven with a sinusoidal voltage (8-9Vp) delivered by driving transformer Dt that is tuned to a specific frequency (2.6 MHz) by capacitors $C_P$, $C_G$, and $C_{iss}$. Feedback capacitor $C_i$ couples driving transformer Dt with the output voltage $V_1$. Resonance capacitor $C_R$ is parallel to the first inductor $L_1$ and coupling capacitor $C_C$ connects the output of the driving transformer Dt to one of the input terminals of first inductor $L_1$ through the ballasting inductor $L_L$. The resonant circuit is tuned on a frequency $f_{RS}$ (about 2.45 MHz) that is slightly lower than the resulting operation frequency ($f_0 \approx 2.5$ MHz). This RF power supply has a 13.5 W loss, of which 7.8 W are attributed to the ballasting inductor $L_L$. This circuit is further explained in U.S. Pat. No. 5,962,987. The particular parameters for this circuit are shown in Table 1 (in FIG. 5) that includes operating characteristics for RF power supplies of the prior art (FIGS. 1-2) and of the present invention (FIGS. 3-4) for a same set of input parameters so that results can be easily compared.

FIG. 2 shows a variation of the circuit of FIG. 1 in which the voltage viewed by the half bridge (the voltage $V_G$ on $C_R$) is reduced by inserting an additional capacitor $C_S$ in series with the first inductor $L_1$, thereby avoiding the bulky coupling capacitor $C_C$. This reduces the inductance of ballasting inductor $L_L$ and thereby reduces the losses in the ballasting inductor $L_L$. The voltage drop on $C_S$ is $V_{CS}=I_1 X_{CS}$, which in this instance is about 190V. This reduces the viewed voltage $V_G$ on $C_R$ from 550V to 360V, which is a 35% reduction. This, in turn, reduces the inductance of ballasting inductor $L_L$ by 35% from 37 µH to 24 µH. The current in ballasting inductor $L_L$ can also be reduced from 3.8 App to 3.4 App by reducing the phase angle between $I_L$ and the fundamental sine wave $V_{0f}$ contained in the half bridge midpoint voltage, which is trapezoidal in consequence of ZVS. As a result, the loss in the ballasting inductor is reduced to about 4.4 W (with a further 3.6 W loss in transistors $S_1$ and $S_2$) so that the total loss is 9.4 W, thereby increasing the efficiency from 91.7 to 94.1%. This circuit is further explained in U.S. Pat. No. 5,446,350. The particular parameters for the circuit of FIG. 2 are also shown in Table 1.

SUMMARY

An object of the present invention is to provide a novel RF power supply for an electrodeless lamp that has an efficiency of at least 95%.

A further object of the present invention is to provide a novel RF power supply for an electrodeless lamp in which the lamp's induction coil (the first inductor $L_1$) is connected in a symmetrical π-filter to further reduce the loss in the ballasting inductor $L_L$.

A yet further object of the present invention is to provide a novel RF power supply for an electrodeless lamp that includes a pair of DC rails, an RF inverter having power input terminals connected between the rails, a first inductor arranged to inductively couple with an electrodeless lamp, where the symmetrical π-filter includes first and second resonance capacitors that each connects a respective one of two input terminals of the first inductor to a same first rail of the pair of DC rails, and a second (ballasting) inductor connecting an output of the RF inverter to one of the two input terminals of the first inductor.

These and other objects and advantages of the invention will be apparent to those of skill in the art of the present invention after consideration of the following drawings and description of preferred embodiments.

BRIEF DESCRIPTION OF THE DRAWINGS

FIG. 5 shows Table 1.

DETAILED DESCRIPTION

Figure 3:
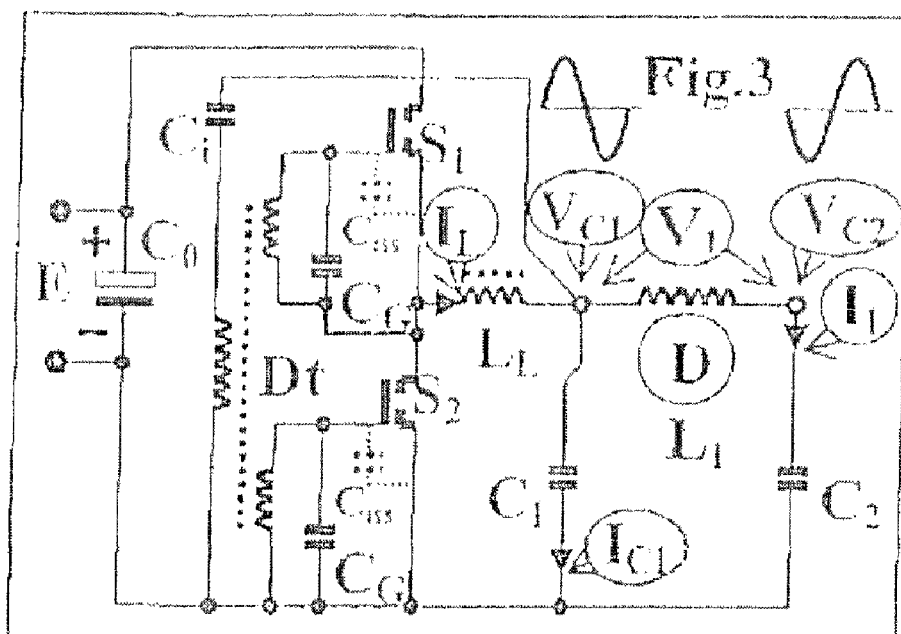
FIG. 3 is a circuit diagram of an embodiment of the RF power supply of the present invention.

With reference now to FIG. 3, in the present invention an RF power supply for an electrodeless lamp D includes a pair of DC rails receiving DC power from DC power source E, an RF inverter having power input terminals connected between the pair of DC rails (the inverter including driving transformer Dt and transistor switches $S_1$ and $S_2$), a first inductor $L_1$ inductively coupled with lamp D, first and second resonance capacitors $C_1$ and $C_2$ that each connects a respective one of two input terminals of first inductor $L_1$ to a same first rail of the pair of DC rails, and a second (ballasting) inductor $L_L$ connecting an output of the RF inverter to one of the two input terminals of first inductor $L_1$. The RF inverter may be either a full bridge or a half bridge inverter.

Figure 1:
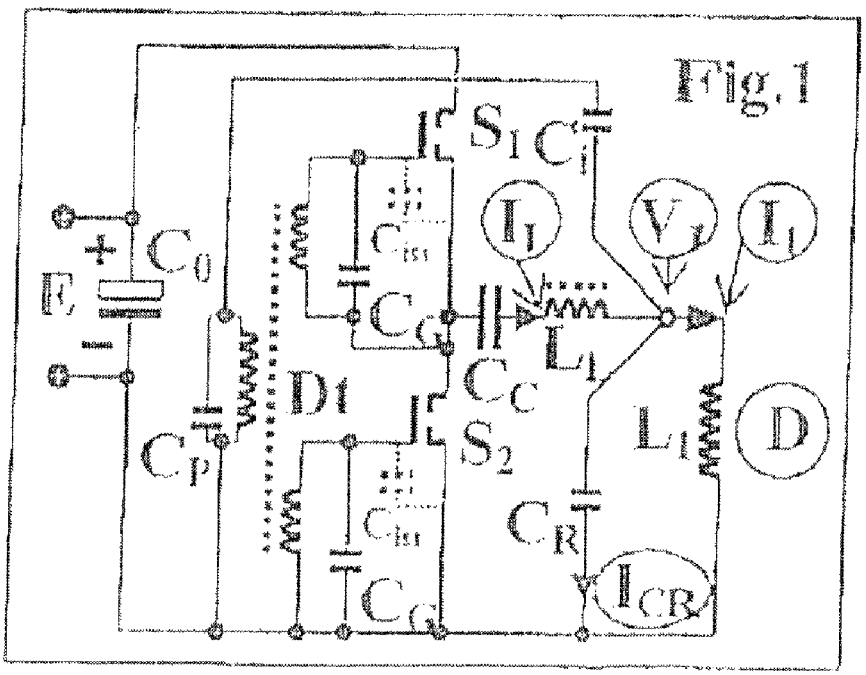
FIG. 1 is a circuit diagram of an RF power supply of the prior art.
Figure 2:
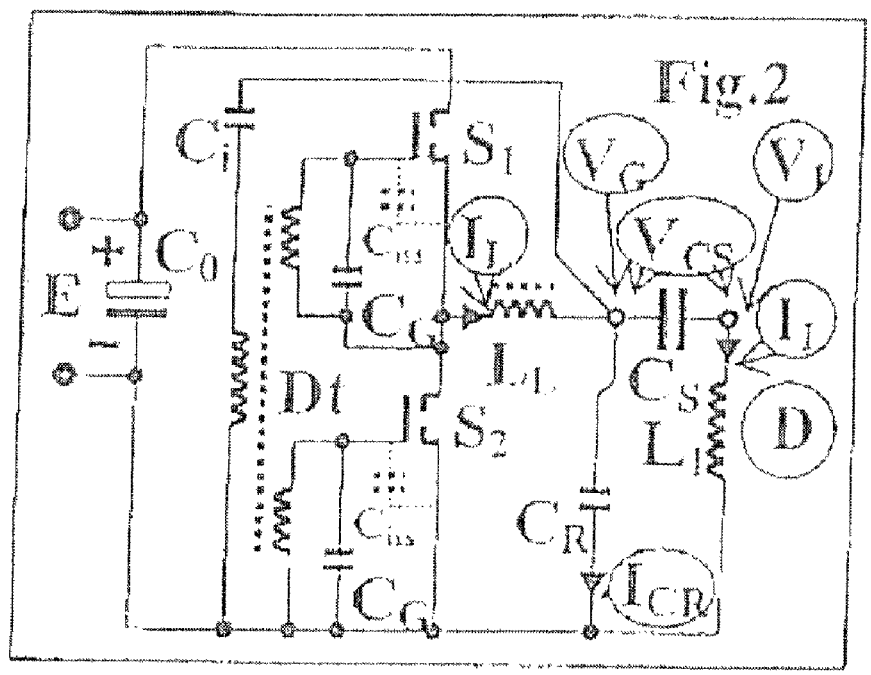
FIG. 2 is a circuit diagram of another RF power supply of the prior art.

Operating characteristics for the embodiment of FIG. 3 are shown in Table 1 (in FIG. 5) for the same input parameters as FIGS. 1 and 2 so that a direct comparison can be made. The operating characteristics listed in Table 1 will be appreciated by those of skill in the art and need not be explained in detail. However, it should be noted that the loss in the ballasting inductor is reduced to 2.7 W (and the loss in switches $S_1$ and $S_2$ to 2.4 W) so that the efficiency increases to 96.0%

As is apparent, the lamps inductor, first inductor $L_1$, is connected in a symmetrical π-filter and thereby supplied by two equal but phase-opposite voltages $V_{C1}$ and $V_{C2}$. Their sum is the lamp voltage $V_1$. Lamp current is the current in second resonance capacitor $C_2$; i.e., $I_1=I_{C2}$. In the example with the input parameters from Table 1, the half bridge sees only half of $V_1$ (277V) and the second (ballasting) inductor $L_L$ has only 18.4 μH. Continuing this example and with further reference to Table 1, the current $I_L$=1.13 A is the vectorial sum of $I_{C1}$=3.1 A and $I_1$=2.25 A, but is the smallest one, which is 3.2 App. In this configuration with 2.7 W loss in second inductor $L_L$, 2.4 W loss in switches $S_1$ and $S_2$, 0.4 W loss in Dt, and 0.3 W loss in resonance capacitors $C_1$ and $C_2$, the total loss is 6.3 W, so that efficiency reaches 96%.

This arrangement is particularly suited for electrodeless lamps with a low power factor (PF=cos $\phi_1$<0.2) because of the low magnetic coupling between the induction coil and the plasma. The suitability may also be enhanced by the low coil inductance and the low operation frequency.

The present invention affords a further advantage in that the HF potentials applied to the first inductor $L_1$ are halved so that the ion bombardment of the phosphors in the lamp are reduced fourfold. This provides a longer life for the lamp and reduces lamp maintenance. One additional advantage related to EMI suppression is that only half the RF potential is against ground, which eases the common-mode interference suppression within the lamp ballast. Thus, in some lamps, the E-field compensating bifilar induction coil can be avoided.

Figure 4:
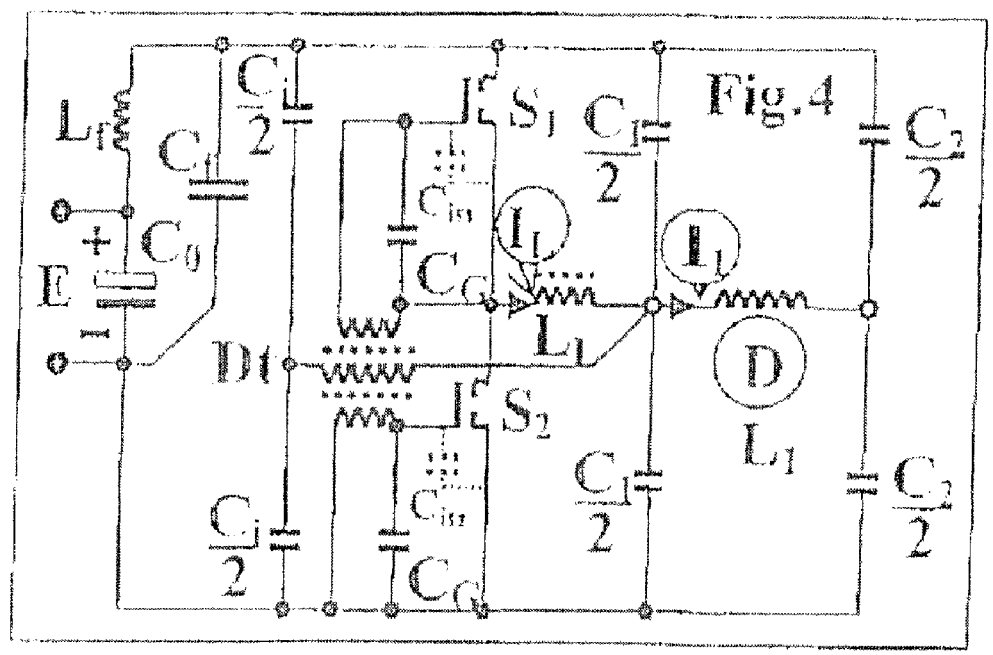
FIG. 4 is a circuit diagram of a second embodiment of the RF power supply of the present invention.

FIG. 4 shows a further embodiment of the RF power supply of the present invention. In this embodiment, the resonance capacitors $C_1$ and $C_2$ are split and connected to respective DC rails. That is, the power supply includes third and fourth resonance capacitors that each connects a respective one of the two input terminals of the first inductor $L_1$ to a same second rail of the pair of DC rails (different than the rail to which $C_1$ and $C_2$ are connected in the first embodiment.) In a similar manner, the feedback capacitor $C_i$ can be split and connected to opposite rails. This arrangement reduces the high frequency ripple current in the electrolytic capacitor $C_0$ and eases once more the EMI suppression.

Further, a low-pass filter, including capacitor $C_f$ and inductor $L_f$, can be added to filter the remaining interference at 2.5 MHz due to ESR so that the parasitic inductance $C_0$ can be filtered to make the RF power supply neutral from the conducted EMI point of view.

Significantly, the circuit of FIG. 4 also reduces the considerable losses in $C_0$ by 0.5 W so that the efficiency is yet further improved to 96.3%.

Figure 6:
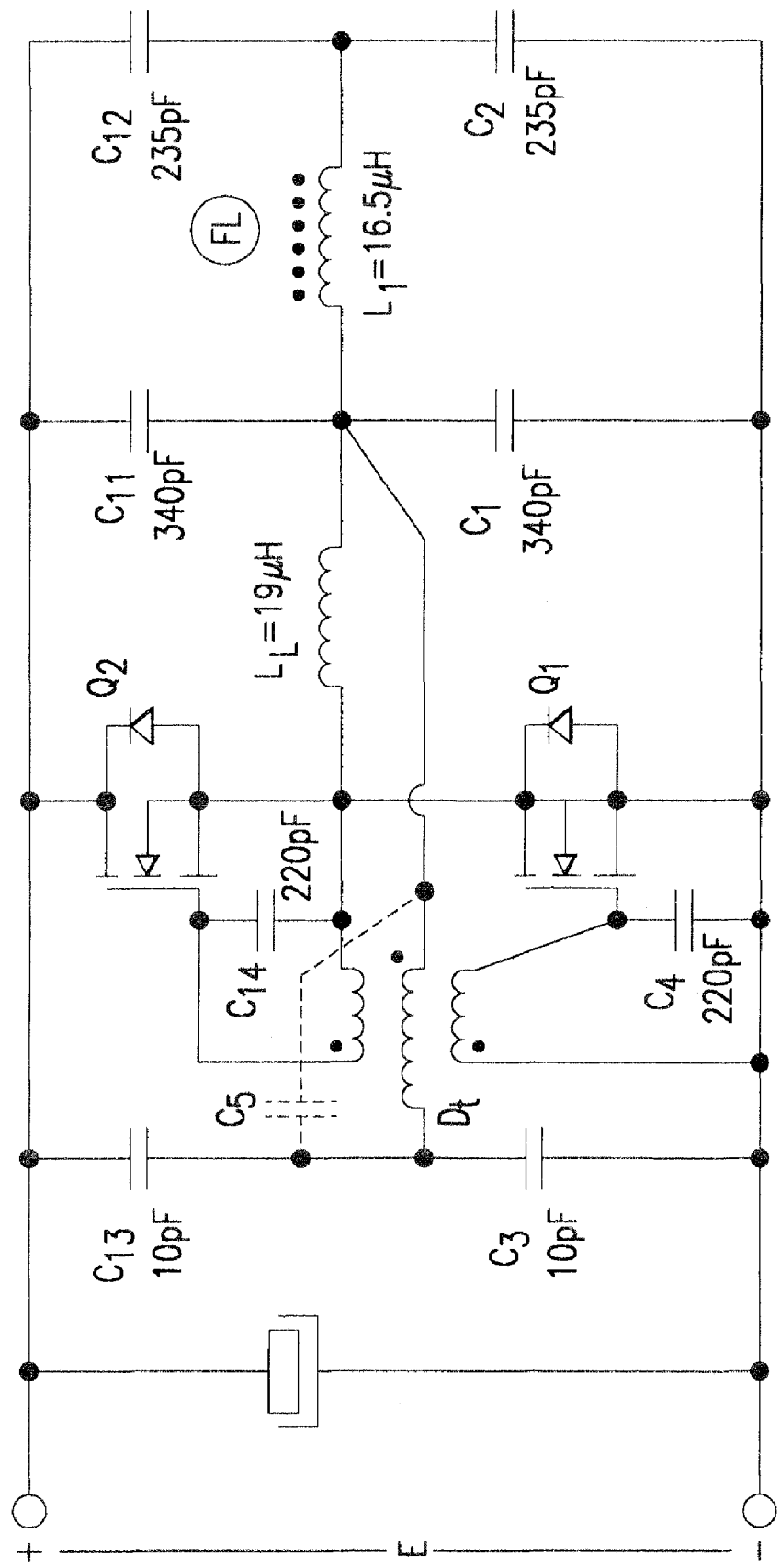
FIG. 6 shows a variation of the second embodiment of the RF power supply of the present invention.

In a variation of the circuit of FIG. 4 shown in FIG. 6, a further capacitor $C_5$ is connected between a first node between the pair of feedback capacitors $C_f/2$ and a second node between resonance capacitors $C_1/2$. The further capacitor $C_5$ is optional and can be used to reduce the dead time between the switching-ON gate controls of $S_1$ and $S_2$ ($Q_1$ and $Q_2$ in FIG. 6.)

The symmetrical topology of the present invention permits implementation of low loss and long lifetime by minimizing the amount of energy stored in the ballasting inductor, reducing ion bombardment by the lamp's induction coil, reducing the stress in the resonance capacitors, and lowering interference levels to ease EMI suppression.

While embodiments of the present invention have been described in the foregoing specification and drawings, it is to be understood that the present invention is defined by the following claims when read in light of the specification and drawings.

We claim:

1. A radio frequency (RF) power supply for an electrodeless lamp, comprising:
   a pair of DC rails;
   an RF inverter having power input terminals connected between said pair of DC rails;
   a first inductor arranged to inductively couple with said electrodeless lamp;
   first and second resonance capacitors that each connects a respective one of two input terminals of said first inductor to a same first rail of said pair of DC rails;
   a second inductor connecting an output of said RF inverter to one of the two input terminals of said first inductor; and
   third and fourth resonance capacitors that each connects a respective one of the two input terminals of said first inductor to a same second rail of said pair of DC rails.

2. The power supply of claim 1, wherein said first and third resonance capacitors have a same capacitance.

3. The power supply of claim 2, wherein said second and fourth resonance capacitors have a same capacitance.

4. The power supply of claim 1, further comprising two feedback capacitors that each connects a driving transformer of said RF inverter to a respective one of said pair of DC rails.

5. The power supply of claim 4, wherein said two feedback capacitors have a same capacitance.

6. The power supply of claim 4, further comprising a further capacitor connected between a first node between said first and second feedback capacitors and a second node between said first and third resonance capacitors.

7. The power supply of claim 1, wherein said RF inverter comprises a driving transformer and two switches controlling operation of said driving transformer, said two switches being controlled by feedback of a derivative of the lamp's input voltage, said derivative being provided by a high-pass capacitance that comprises a first feedback capacitor connected between said driving transformer and a first one of said pair of DC rails and a second feedback capacitor connected between said driving transformer and a second one of said pair of DC rails.

8. The power supply of claim 1, wherein said RF inverter is one of a full bridge and a half bridge inverter.

9. The power supply of claim 1, wherein an efficiency of the power supply is at least 95%.

* * * * *